United States Patent [19]

Drechsel et al.

[11] 4,008,316
[45] Feb. 15, 1977

[54] APPARATUS FOR PRODUCING SO₃ AND SULPHURIC ACID BY A CATALYTIC OF GASES WHICH CONTAIN SO₂

[75] Inventors: Herbert Drechsel; Karl-Heinz Dorr; Hugo Grimm, all of Frankfurt am Main, Germany

[73] Assignee: Metallgesellschaft Aktiengesellschaft, Frankfurt am Main, Germany

[22] Filed: July 10, 1972

[21] Appl. No.: 270,396

Related U.S. Application Data

[63] Continuation of Ser. No. 4,084, Jan. 19, 1970, which is a continuation of Ser. No. 768,958, Sept. 30, 1968, which is a continuation of Ser. No. 465,570, June 21, 1965.

[30] Foreign Application Priority Data

June 23, 1964 Germany .............................. 61479
July 8, 1964 Germany .............................. 61638

[52] U.S. Cl. .............................. 423/533; 423/535
[51] Int. Cl. .................... C01b 17/72; C01b 17/68; C01b 17/70
[58] Field of Search .......... 423/522, 532, 533, 535, 423/536

[56] References Cited

UNITED STATES PATENTS

| | | | |
|---|---|---|---|
| 3,142,536 | 7/1964 | Guth et al. | 423/533 |
| 3,147,074 | 9/1964 | Maurer | 423/522 |
| 3,259,459 | 7/1966 | Moller | 423/536 |

*Primary Examiner*—Oscar R. Wertz
*Assistant Examiner*—Mary P. Straub
*Attorney, Agent, or Firm*—Burgess, Dinklage & Sprung

[57] ABSTRACT

Process for production of SO₃ by catalytic oxidation of SO₂ which comprises carrying out the oxidation in two stages with intermediate absorption. The conversion of SO₂ in the first stage is about 70–80% for a starting gas which is a cooled and cleaned roaster gas and 70–90% for a starting gas which is a sulfur combustion gas. The second stage comprises two catalyst beds, and the gas is cooled intermediate the beds. High overall conversion is obtained with low catalyst requirement.

28 Claims, 5 Drawing Figures

APPARATUS FOR PRODUCING SO₃ AND SULPHURIC ACID BY A CATALYTIC OF GASES WHICH CONTAIN SO₂

This application is a continuation of application Ser. No. 4,084, filed Jan. 19, 1970, which is a continuation of Ser. No. 768,958, filed Sept. 30, 1968, which is a continuation of Ser. No. 465,570, filed June 21, 1965.

For economic reasons and in order to avoid a contamination of the air with $SO_2$, the catalytic oxidation of $SO_2$ to $SO_3$ should be carried out to a conversion which is as high as possible. To avoid a contamination of the air, it is even necessary to increase the conversion to values which would not be desired for economic reasons. This leads to the problem of accomplishing this increased conversion by a method which is as economical as possible.

The known catalytic processes carried out in contacting furnaces comprising a plurality of contacting trays and effecting a single-stage absorption of the catalytically formed $SO_3$ in a plurality of stages. The intermediate absorption of $SO_3$ prevents the attainment of the equilibrium under the law of mass action and influences the reaction by promoting the reaction of $SO_2$ in the following contacting stages so that the over-all conversion is increased.

A plurality of suggestions have been made in this field with the desire to attain before the first absorption stage a preliminary conversion which is as high as possible, amounting to about 90% and more. Most of these suggestions, however, have not been accepted in practice because the processes are not thermally self-sufficient when cleaned starting gases at an initial temperature below 100° C. are used so that these processes are uneconomical or involve unecomonical capital investment, and because the technological difficulties involved in maintaining heat balance were not overcome.

Other processes involving intermediate absorption are known, which use wet catalysis. This means that the gases subjected to catalysis are not cleaned and dried gases which contain $SO_2$ but inherently contain steam or have been supplied with steam in various ways. These wet catalytic processes have the disadvantage that it is very difficult to absorb the resulting $SO_3$ from the moist gases so that $SO_3$ fogs escape, which can be eliminated only in part even with additional equipment or involve very high capital investment.

Only recently, processes have been disclosed which overcome the disadvantages of these suggestions and enable an intermediate absorption which is economical and thermally self-sufficient.

These processes use cleaned and dried gases from roasting, which have an $SO_2$ content of 9–12%, and result in a conversion in excess of 99.5%. The starting gases are heated to the initiation temperature of the first contacting tray by heat exchange with the completely and partly catalyzed gases, respectively, escaping from the last contacting stage and from the first one, which consists of two contacting trays. Then the gases are introduced into this first contacting tray. Cold gas is blown into the gases being treated for cooling them between the first and second contacting trays. The precatalyzed gases from the first contacting stage are cooled down to the initiation temperature of the second contacting stage by heat exchange with the preheated starting gases and leave this contacting stage after a conversion of 80 – 90% to enter a heat exchanger where they are cooled to 175°–215° C. by the gases leaving the intermediate absorber. The resulting $SO_3$ is then subjected to intermediate absorption with strong absorbing acid. The emerging gases are adjusted to the initiation temperature of the third contacting stage by heat exchange with the precatalyzed hot gases from the second contacting stage and are subjected to final conversion in the third contacting stage. The residual $SO_3$ is then absorbed in the final absorber.

It has also been suggested to limit the conversion in the first contacting stage to lower values.

For instance, a process is known in which a certain amount of water vapor is added to the sulphur combustion gases. In a first contacting stage, a conversion of about 65% is effected. The preconverted gases, which contain water vapor, are slowly cooled in heat exchangers to a temperature below the dew point. This process has the disadvantage that the cooling must be very slow in order to avoid fogging. For this reason, the heat exchangers must be very large, which is uneconomical, and corrosion problems arises, which can hardly be solved or can be solved only under uneconomical conditions.

Another known process aims at accomplishing a preconversion of 70–90%. This process uses also sulphur combustion gases and for supplying its heat requirements needs hot starting gases at more than 700° C.

There is a strong prejudice in the art against a preconversion of 60–80% and an intermediate absorption with strong sulphuric acid because it is feared that the highly corrosive sulphuric acid fogs cannot be avoided in this process and cannot be eliminated even by additional coke filters. To overcome this prejudice, it has been suggested to react particularly strong, moist, sulphur combustion gases containing at least 10% $SO_2$ in a first contacting stage to a conversion of 25–40%, to effect intermediate absorption of the resulting $SO_3$ with weak sulphuric acid of 93%, at most, and to transform the sensible heat of the gas into latent heat of evaporation so that the water is evaporated from the acid and the water content of the gas is increased. It is desired thus to form sulphuric acid fogs which can be eliminated by common filters, such as coke filters. To be thermally self-sufficient, this process requires hot, strong and moist sulphur combustion gases. The occurrence of corrosive sulphuric acid fumes can be localized, but cannot be avoided. Another disadvantage is the production of a considerable amount of weak sulphuric acid.

Processes according to the invention are represented in the accompanying drawings, wherein.

Surprisingly it has been found that a two-stage reaction and absorption of cold, cleaned and dried, $SO_2$-containing gases poor in $SO_2$, e.g. having an $SO_2$-content of 5.5–9%, preferably 6–7%, which gases are produced mainly be roasting sulphur containing minerals, is possible in a thermally self-sufficient catalytic process with a preliminary conversion of 70–80% of the gases in the first contacting stage, production of strong sulphuric acid of 98–98.5% by intermediate absorption and an overall conversion of more than 99.5% of the entire $SO_2$-content, without formation of disturbing, corrosive sulphuric acid fogs, which would have to be removed by special filters, and with economically tolerable heat exchange areas.

Thus, the invention provides a process for production of $SO_3$ by catalytic conversion of $SO_2$ which comprises preheating a clean, dry $SO_2$-containing feed gas having an $SO_2$ content less than about 9%, to catalyst initiation temperature, by heating the gas by indirect heat exchange with hot $SO_3$-containing gas. The hot gas is passed through a first contacting stage, and the gas from the first contacting stage is passed through an absorber for removal of $SO_3$ formed in the first contacting stage. From the absorber, the gas is passed through at least one additional catalyst contacting stage for conversion of $SO_2$ to $SO_3$, and $SO_3$ produced in the contacting following the first contacting stage is recovered. In the process, hot $SO_3$-containing gas is used for the heating of the feed gas. Characteristically, the conversion in the first stage is about 70–80% based on the $SO_2$ content of the gas.

Preferably, there are only two contacting stages. The main advantage of the process according to the invention over the processes which have previously been employed in practice with multiple absorption and a high preconversion resides in the substantially reduced capital investment. Thus, the saving of catalyst is about 30% or 80 liters per day ton of $SO_3$ monohydrate, as only 35 – 45 preferably 40 liters catalyst (usual vanadium catalyst) per day ton monohydrate are required in the first contacting stage. The construction costs for the contacting vessels are also reduced. Conventional catalysts can be used. By "$SO_3$ monohydrate" is meant 100% $H_2SO_4$.

The process according to the invention employs two contacting trays or beds of catalyst in each of the two contacting stages, intermediate absorption of the resulting $SO_3$ with highly concentrated sulphuric acid after the first contacting stage, the provision of heat exchangers after each contacting tray, the preheating of the major part of the cold starting gas in the final heat exchanger to about 320°–340° C by heat exchange with the completely catalyzed gases, and the subsequent heat exchange of this major part of the starting gases in an intermediate heat exchanger with the precatalyzed gases from the first contacting tray to heat the gas to initiation temperature of the first contacting tray. A smaller, partial stream of the feed gases is heated in an intermediate heat exchanger approximately to the temperature of the main gas stream entering the first-mentioned intermediate heat exchanger, by heat exchange with the $SO_3$ containing gases leaving the third tray, which are thus cooled to the operating temperature of the fourth or last contacting tray. This minor part of the feed gas is then combined with the major stream before the latter enters the intermediate heat exchanger. The $SO_3$-containing gases which leave the first contacting stage after a conversion of about 70–80% are cooled in a heat exchanger to about 140° C. by heat exchange with the $SO_3$-freed gases from the intermediate absorber, whereby the $SO_3$-freed gases are adjusted to the operating temperature of the third contacting tray. The intermediate absorption is carried out in the known absorbers. The absorbing liquid consists of sulphuric acid of high concentration preferably of 98–98.5%. Additional filters are not required because there are virtually no sulphuric acid fogs.

According to a preferred embodiment of the process according to the invention, a further partial stream of the cold starting gas is added in a mixing chamber to the hot, precatalyzed gases from the first contacting tray before these gases enter the intermediate heat exchanger. This partial stream amounts to about 8–10% of the total starting gas and reduces the temperature of the precatalyzed gases from about 595°–610° C. to about 565°–550° C. This small temperature reduction enables the use of ordinary materials, such as wrought iron, for constructing the intermediate heat exchanger, whereas special steels are required at the exit temperature of the precatalyzed gas.

In another preferred embodiment, a partial stream or an additional partial stream of about 7–15% of the cold starting gases is fed to a second stage of the heat exchanger connected between the two contacting stages, this partial stream is preheated to about 80° – 100° C., and the gas is then further heated to the operating temperature of the first or second contacting tray and is introduced into the respective tray. This mode of operation renders the process thermally self-sufficient particularly with very poor gases.

In addition to the thermal self-sufficiency, a special advantage of the process resides in the ease with which it can be adjusted to varying $SO_2$ contents of the starting gas and in the design of the heat exchange areas for optimum conditions, i.e. for high $SO_2$ contents. Only the second stage of the heat exchanger connected between the two contacting stages serves as a controlling area.

When highly concentrated (e.g. 9%) gases are being processed, no partial stream of the cold starting gas is passed through the second stage of the heat exchanger connected between the two contacting stages, and the surplus heat, which cannot be utilized economically, is dissipated by the acid which circulates through the intermediate absorber. With poor gases, a partial stream is preheated in the second stage of this heat exchanger and is passed e.g., into the mixing chamber, whereas that partial stream of the cold starting gases which is fed to the mixing chamber is throttled or shut off.

The process according to the invention utilizing gases containing less than about 9% $SO_2$ will be described more in detail in Example 1 and Example 2, infra, which describe operation according to FIG. 1 and FIG. 2, respectively.

Figure 1:
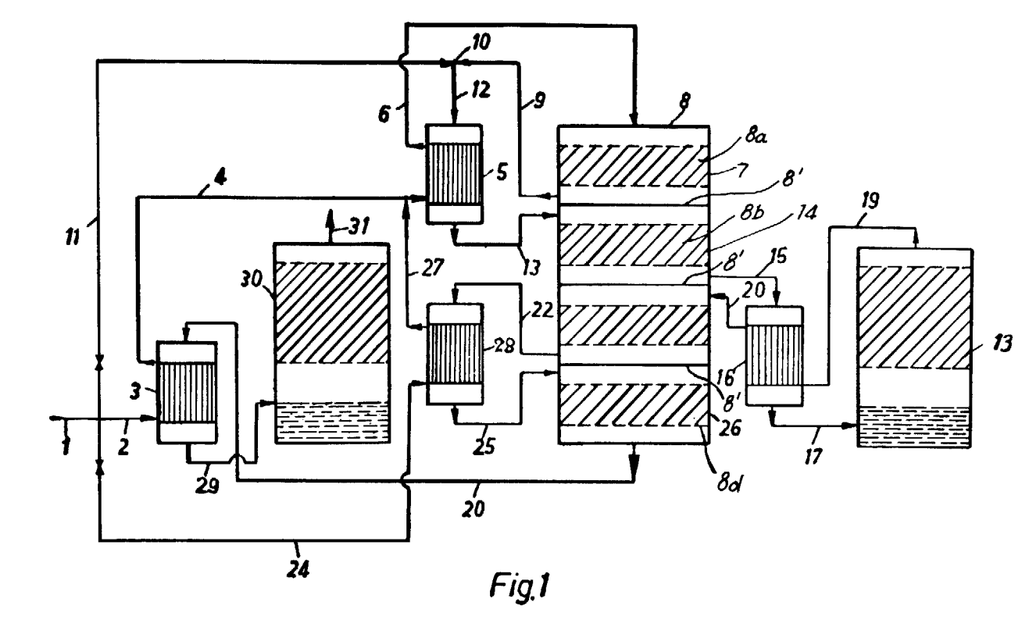
FIG. 1 and FIG. 2 are flow sheets for a process using a gas lean in $SO_2$.

EXAMPLE 1 (FIG. 1)

Gas from roasting, containing 6.7% $SO_2$ by volume, is cooled, cleaned and dried in known manner and fed at a temperature of 60° C. and at a rate of 14,150 standard cubic meters per hour to the catalytic process through conduit 1. A partial stream of 10,530 standard cubic meters per hour is fed through conduit 2 into the final indirect heat exchanger 3, which comprises 40% of the entire heat exchange area. This partial stream is heated in the heat exchanger 3 to 340° C. and is fed through conduit 4 into the intermediate indirect heat exchanger 5, which comprises 8% of the entire heat exchange area. In the heat exchanger 5, the partial stream is heated to 430° C. and is then fed through conduit 6 into the first tray of the contacting vessel 8, which includes four beds of catalyst, 8a–8d, divided by separators 8'.

The first tray contains 15% of the total catalyst mass. The precatalyzed gases leave the contacting vessel 8 through conduit 9 and are fed at a temperature of 590° C. into the mixing chamber 10 and cooled to 565° C. by a partial stream of 1,150 standard cubic meters per hour of the cold starting gas supplied through conduit 11. The precatalyzed gases are fed through conduit 12 into the intermediate indirect heat exchanger 5, where they are cooled to 470° C., and are then fed through conduit 13 into the second contacting tray 14, which contains 15% of the entire catalyst mass.

The further catalyzed gas, at a temperature of about 500° C. and after a conversion of about 80%, is fed through conduit 15 into the indirect heat exchanger 16, which comprises 48% of the total heat exchange area. In this heat exchanger 16, the precatalyzed gas is cooled to 150° C. and is then passed through conduit 17 into the intermediate absorber 18. The inflowing gas is contacted with 98.5% sulphuric acid at 70° C. trickling in a countercurrent and is thus freed from $SO_3$, (not shown). Then the gas is fed at a temperature of 70° through conduit 19 into the indirect heat exchanger 16, where it is heated to 420° C. and is then fed through conduit 20 into the third contacting tray 21, which contains 30% of the entire catalyst mass. The further catalyzed gas from the third tray is fed through conduit 22 into the intermediate indirect heat exchanger 23, which comprises 4% of the entire heat exchange area. In the heat exchanger 23, the further catalyzed gas is cooled to 400° C by heat exchange with a partial stream of 2,470 standard cubic meters per hour of the cold starting gas, which stream is supplied through conduit 24. The further catalyzed gas is then fed through conduit 25 into the fourth and last contacting tray 26, which contains 40% of the entire catalyst mass. The partial stream of the starting gas preheated to 340° C is passed through conduit 27 and combined with the main stream of the starting gases flowing in conduit 4. The finally catalyzed gases leave the contacting vessel 8 after a conversion of more than 99.5% and at a temperature of 405° C. in conduit 28. They are cooled to 150° C. in the final heat exchanger 3 and fed through conduit 29 into the final absorber 30, where they are contacted with 98.5% sulphuric acid at 70° C. trickling in a counter-current. The gas free of $SO_3$ and containing little $SO_2$ leave the absorber via outlet 31.

Figure 2:
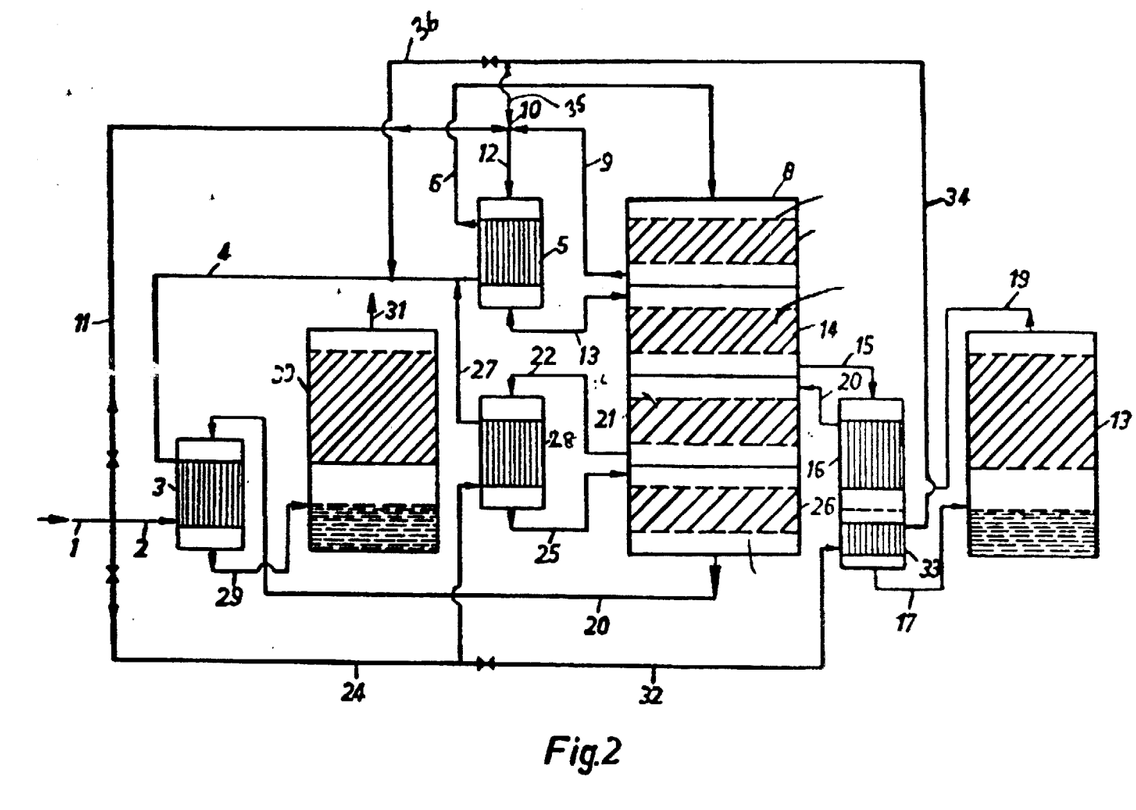

EXAMPLE 2 (FIG. 2)

Like reference characters in FIG. 1 and FIG. 2 refer to corresponding parts.

A gas from roasting, containing 6.7% $SO_2$, is cooled, cleaned and dried, and is supplied at a temperature of 60° C and at a rate of 16,060 standard cubic meters per hour to the catalytic process through conduit 1. A partial stream of 11,100 standard cubic meters per hour is fed through conduit 2 into the final heat exchanger 3, which comprises 36% of the entire heat exchange area. In this heat exchanger 3, the partial stream is preheated to 340° C. and is then fed through conduit 4 into the intermediate heat exchanger 5, which comprises 8% of the entire heat exchange area. In the heat exchanger 5, the partial stream is heated to 430° C. and is then fed through conduit 6 into the first tray of the contacting vessel 8.

The first tray contains 14% of the total catalyst mass. The precatalyzed gases leave the contacting vessel 8 through conduit 9 and are fed at a temperature of 590° C. into the mixing chamber 10, where they are cooled to 565° C. with a partial stream of the starting gases. This partial stream has been fed through conduit 32 into the second stage 33 of the heat exchanger 16, 33. In this stage 33, which comprises about 4% of the entire heat exchange area, the partial stream is preheated to 90° and is then fed to the mixing chamber 10 through conduit 34. From the mixing chamber 10, the gases are fed through conduit 12 into the intermediate heat exchanger 5, where they are cooled to 470° C., and are then passed through conduit 13 into the second contacting tray 14, which comprises 16% of the entire catalyst mass.

After a conversion of about 80%, the further catalyzed gas is fed at a temperature of 500° C. through conduit 15 into first stage 16 of the heat exchanger 16, 33. In this stage 16, which comprises 48% of the entire heat exchange area, the further catalyzed gas is cooled to 140° C. In the second stage 33 of the heat exchanger 16, 33, the further catalyzed gas is cooled further to 130° C. and is then fed through conduit 17 into the conventional intermediate absorber 18. The inflowing gas is contacted with 98.5% sulphur acid at 70° C. trickling in a counter-current and is thus freed from $SO_3$ (not shown). Then the gas is fed at a temperature of 70° C. through conduit 19 into the heat exchanger stage 16, where it is heated to 420° C., and is subsequently fed through conduit 20 into the third contacting tray 21, which contains 30% of the entire catalyst mass. The further catalyzed gas is fed through conduit 22 into the intermediate heat exchanger 23, which comprises 4% of the entire heat exchange area, and where the further catalyzed gas is cooled to 400° C. by heat exchange with a partial stream of 2,760 standard cubic meters per hour of the cold starting gas fed through conduit 24. Through conduit 25, the further catalyzed gas is fed into the last contacting tray 26, which contains 40% of the entire catalyst mass. That partial stream of the starting gas which has been preheated to 340° C. is passed through conduit 27 to conduit 4, where it is combined with the main stream of the starting gases. After an over-all conversion of more than 99.5%, the finish-catalyzed gases leave the contacting vessel 8 at a temperature of 405° C. through conduit 28 and are cooled to 130° C. in the final heat exchanger 3 and fed through conduit 29 into the final absorber 30, where they are contacted with 98.5% sulphuric acid at 70° C trickling in a counter-current (not shown), and are discharged through conduit 31 at a temperature of 70° C.

Conduits 11, 24, and 32 are provided with valves for proportioning flow. Line 34 divides into lines 35 and 36, each of which is outfitted with a valve for proportion flow of gas from the second heat exchanger 33, between the mixer 10 and the inlet to heat exchanger 5.

It has been found that the arrangement of the contacting vessel and of the heat exchangers suggested above for feed gas containing up to about 9% $SO_2$, can be used to advantage also for the catalysis of sulphur combustion gases which contain 8–11% $SO_2$, especially if the heat exchanger connected between the first and second contacting trays and the heat exchanger between the third and fourth contacting trays are supplied with dried cooling air, which can then be introduced as preheated combustion air into the sulphur combustion furnace. The second stage of the heat exchanger connected between the two contacting stages, and the final heat exchanger are designed as steam generators or as feed water preheaters, and together with the heat quantity recovered in the two intermediate heat exchangers result in the generation of a considerable heat surplus by the system.

In this process, combustion gas containing about 8–11% $SO_2$ is passed through a first catalytic contacting stage for conversion of part of the SO₂ to SO₃. The effluent from the first contacting stage is cooled and the cooled effluent is subjected to an absorption treatment to remove SO₃ therefrom. The absorption can be conventional. The effluent gas from the absorption is passed through at least one additional catalytic contacting stage for conversion of SO₂ to SO₃. The SO₃ produced in the contacting following the first contacting stage is recovered. The process is characterized in that the conversion in the first stage is about 70–90% based upon the SO₂ content of the starting gas.

In one embodiment, the heat exchange or cooling between the first and second, and the third and fourth contacting trays can be performed so that the heat which is dissipated is utilized, e.g. for generating or superheating steam or for preheating water. In this case the combustion air is not preheated and the sulphur is burnt with cold air.

In a further modification, the second stage of the heat exchanger connected between the first and second contacting stages may be utilized as an air preheater for the combustion air. Other cooling medium can be used in the second stage. In addition, the steam generator succeeding the last contacting tray may be replaced by an air preheater for the combustion air.

The process employing combustion gases (8–10% sulphur dioxide) has the advantages mentioned above for the process employing roaster gas, especially the advantage of economy in respect to catalyst, and further the design of the second stage of the heat exchanger connected between the first and second contacting stages as a steam generator or air preheated enables a higher steam recovery in the system.

If the intermediate absorber is designed as an immersion type absorber, using acid at an elevated temperature of about 200° C., a considerable further heat recovery, e.g., for the recovery of steam, can be achieved.

The process according to the invention employing combustion gases will be explained more fully and by way of example with reference to FIG. 3 of the drawing.

The gas produced in the sulphur combustion chamber 51 is at a temperature of 1150° C and has an SO₂-content of 10% and is passed through conduit 52 into the waste heat boiler 53, where the gas is cooled. At a temperature of about 420° C, the gas is fed through conduit 54 into the first contacting tray 55 of the contacting vessel 56 and leaves this contacting tray in conduit 57 at a temperature of about 600° C. and is cooled in the mixing chamber 58 with dried cold air, which is at 50° – 60° C. and supplied through conduit 59. The gas flows through conduit 60 into the heat exchanger 61, where the precatalyzed gas is cooled to 460° C. by heat exchange with cold air, which is fed into the heat exchanger from the blower 62 through the conduit 63. The air is discharged from the heat exchanger 61 through the conduit 64. From the heat exchanger 61, the gas is fed through conduit 65 into the second contacting tray 66. After a conversion of 85%, the further catalyzed gas at a temperature about 515°C. is fed into the intermediate heat exchanger 68 and steam generator or feed water preheater 69, where it is cooled to 170° C., and is then fed through conduit 70 into the intermediate absorber 71. The SO₃-freed gases leave the intermediate absorber 71 at about 70° C. through conduit 72 and are heated to 420°C in the intermediate heat exchanger 68 and then fed through conduit 73 into the third contacting tray 74. At a temperature of 460° C, the gases enter through conduit 75 the heat exchanger 76, where they are cooled to 400° C. with cold air, which is supplied through conduit 77 and discharged through conduit 78. Through conduit 79, the gases are fed to the last contacting tray. After an overall conversion of 99.6%, the finish-catalyzed gases at a temperature of about 405° C. leave the contacting vessel 56 through conduit 81 and are cooled to about 170° C. in the steam generator or feed water preheater 82, fed through conduit 83 into the final absorber 84, where they are freed from SO₃, and are then discharged through conduit 85. The feed water preheaters 69 and-/or 82 may be associated with the waste heat boiler 53.

The cold air discharged through conduit 64 from heat exchanger 61 is combined with the cooling air emerging through conduit 78 from heat exchanger 76 and flows as preheated combustion air at 300° C. through conduit 86 into the sulphur combustion chamber 51.

It will be observed that there is substantial similarity between the equipment utilized for the treatment of, on the one hand, roaster gas, and, on the other hand, combustion gas. An important aspect of the invention is the adaptability of the basic apparatus for use in either process.

Thus, the invention provides apparatus for conversion of SO₂ to SO₃ and recovery of SO₃, including a catalytic converter having four beds of catalysts for conversion of SO₂ to SO₃. A first intermediate indirect heat exchanger is operatively connected with the first and second catalyst beds to receive gas from the first bed, cool the gas, and deliver it to the second bed. An intermediate absorber, which can be of conventional construction, is utilized for intermediate recovery of SO₃ from the gas being processed. A second intermediate indirect heat exchanger is operatively connected between the converter and the intermediate absorber for receiving gas from the second bed, cooling the gas and delivering the cooled gas to the intermediate absorber. This second intermediate heat exchanger receives and heats gas from which SO₃ has been removed in the intermediate absorber. The heated gas is returned to the converter for passage through the third bed. The apparatus also includes a third intermediate indirect heat exchanger this third exchanger is operatively connected with the third and fourth bed to receive gas from the third bed, cool the gas deliver it to the fourth bed. Also included is a product gas indirect heat exchanger operatively connected for receiving and cooling gas from the fourth bed. Finally, the apparatus includes a product gas absorber which is operatively connected with the product gas heat exchanger for receiving cooled product gas therefrom for passage of the cooled gas through the absorber for absorption of SO₃ from the gas.

Desirably, the apparatus includes an auxiliary indirect heat exchanger (for example the heat exchanger 16, 33 in FIG. 2) operatively interposed in the connection between the second intermediate heat exchanger for further cooling, and delivers the resulting coal gas to the intermediate absorber.

In the apparatus, it is desirable to install a mixer for receiving the feed to the first intermediate heat exchanger from the first catalyst bed. The mixer also receives another gas, the other gas being at such a temperature that the gas received from the first catalyst bed is cooled. In this way, the gas introduced into the first intermediate heat exchanger is reduced in temperature, and, consequently, low cost construction materials can be used for the exchanger.

EXAMPLE 3. (FIG. 3)

1360 kg of sulphur per hour together with 9300 standard cubic meters per hour of dried air with a temperature of 220° C are burnt in the sulphur combustion chamber 51. The gas produced is at a rate of 9300 standard cubic meters at a temperature of 1150° C. and has a $SO_2$-content of 10% by volume. The gas is passed through conduit 52 into the waste heat boiler 53, where the gas is cooled to a temperature of 420° C. 5400 kg of saturated steam per hour at a pressure of 22 atm above atmospheric are produced from feed water of a temperature of 100° C. in the waste heat boiler 53. The cooled gas is fed through conduit 54 into the first contacting tray 55 of the contacting vessel 56. The tray 55 contains 18% of the whole catalyst. The gas leaves the contacting tray 55 in conduit 57 at a temperature of 600° C. and is cooled in the mixing chamber 58 with 900 standard cubic meters per hour of cold dried air, which is at 50° C. and supplied throgh conduit 59. The gas flows through conduit 60 into the heat exchanger 61, where the precatalyzed gas is cooled to 460° C. by heat exchange with 6200 standard cubic meters per hour of cold air, which is at 50° C. and is fed into the heat exchanger 61 from the blower 62 through the conduit 63. The air is discharged from the heat exchanger 61 through the conduit 64 at a temperature of 220° C. From the heat exchanger 61, the gas is fed through conduit 65 into the second contacting tray 66. The tray 66 contains 22% of the whole catalyst. After a conversion of 86% the further catalyzed gas at a temperature of 515° C. is fed through conduit 67 into the intermediate heat exchanger 68, where it is cooled to 220° C. by heat exchange with the outflowing gas from the intermediate absorber 71 which is fed into the intermediate heat exchanger 68 at a temperature of 70° C. through the conduit 72. The cooled gas is fed into the feed water preheater 69, where it is further cooled to 170° C., and is then fed through conduit 70 into the intermediate absorber 71. The inflowing gas is contacted with 98.5% sulphuric acid at 70° C. trickling in a counter-current and is thus freed from $SO_3$ (not shown). Then the gas is fed at a temperature of 70° C. through conduit 72 into the intermediate heat exchanger 68, where it is heated to 420° C. and then fed through conduit 83 into the third contacting tray 74. At a temperature of 460° C., the gas enters through conduit 75 the heat exchanger 75, where it is cooled to 400° C. with 3100 standard cubic meters per hour of cold dried air at 50° C. which is supplied through conduit 77 and discharged through conduit 78 at a temperature of 220° C. Through conduit 79, the gas is fed to the last contacting tray 80. After an overall conversion of 99.7%, the finish-catalyzed gas at a temperature of 405° C. leaves the contacting vessel 56 through conduit 81 and is cooled to 170° C. in the feed water preheater 82, fed through conduit 83 into the final absorber 84 where it is freed from $SO_3$ by contacting with 98.5% sulphuric acid at 70° C. trickling in a counter-current (not shown) and then discharged through conduit 85. The cooling air, discharged from heat exchanger 76 through conduit 78 and discharged from heat exchanger 51 through conduit 64 is combined and fed into sulphur combustion chamber 1 through conduit 86 at a rate of 9300 standard cubic meters at a temperature of 220° C.

Figure 4:
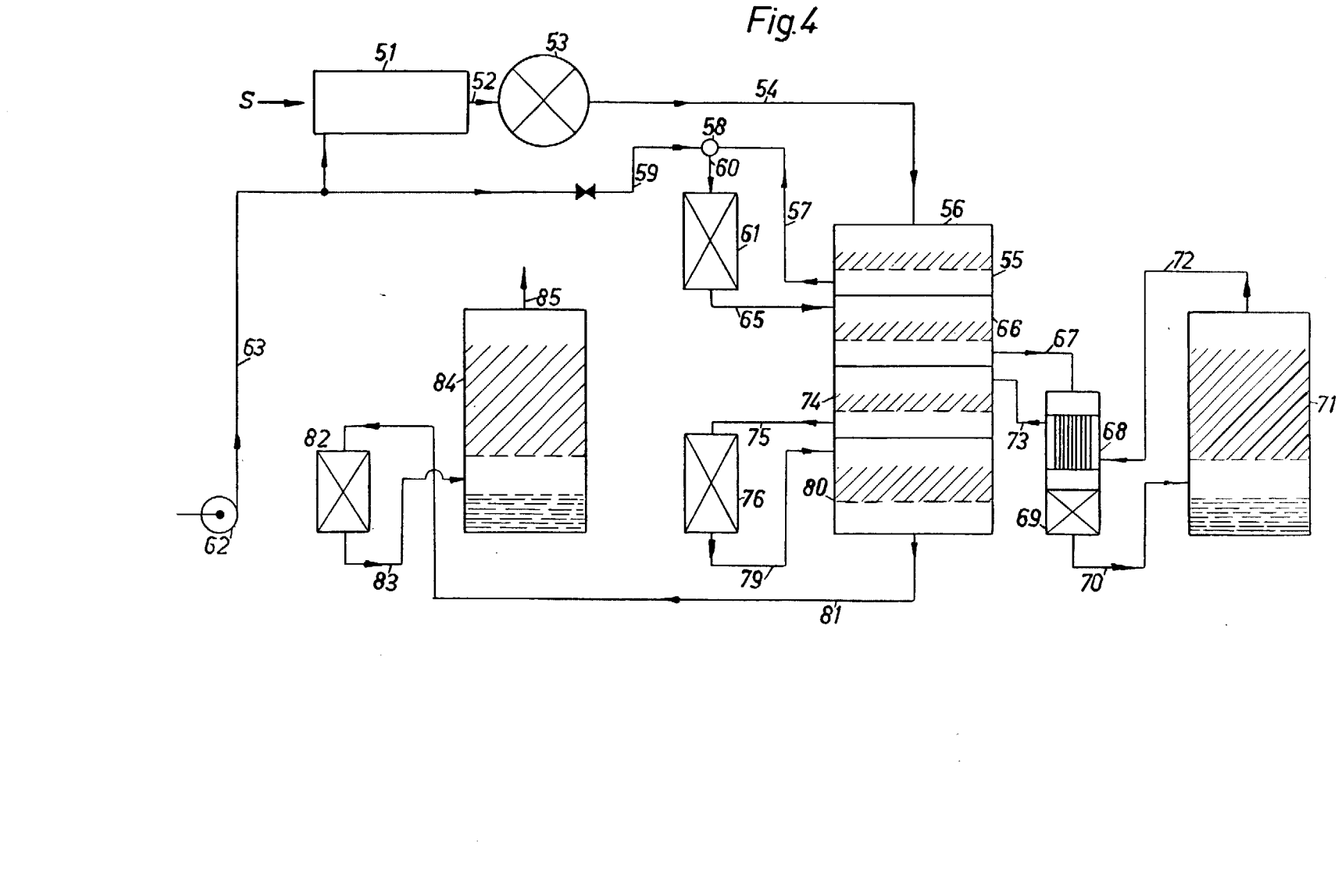

EXAMPLE 4. (FIG. 4)

1360 kg of sulphur per hour together with 9300 standard cubic meters per hour of dried air with a temperature of 50° C are burnt in the sulphur combustion chamber 51. The gas produced is at a rate of 9300 standard cubic meters at a temperature of 1040° C. and has a $SO_2$-content of 10% by volume. The gas is passed through conduit 52 into the waste heat boiler 53, where the gas is cooled to a temperature of 420° C. The cooled gas is fed through conduit 54 into the first contacting tray 55 of the contacting vessel 56. The tray 55 contains 18% of the whole catalyst. The gas leaves the contacting tray 55 in conduit 57 at a temperature of 600° C. and is cooled in the mixing chamber 58 with 900 standard cubic meters per hour of cold dried air, which is at 50° C. and supplied through conduit 59. The gas flows through conduit 60 into the steam generator 61, where the precatalyzed gas is cooled to 460° C. From the steam generator 61, the gas is fed through conduit 65 into the second contacting tray 66. The tray 66 contains 22% of the whole catalyst. After a conversion of 86% the further catalyzed gas at a temperature of 515° C. is fed through conduit 67 into the intermediate heat exchanger 68, where it is cooled to 220° C. by heat exchange with the outflowing gas from the intermediate absorber 71 which is fed into the intermediate heat exchanger 68 at a temperature of 70° C. through the conduit 72. The cooled gas is fed into the feed water preheater 69, where it is further cooled to 170° C., and is then fed through conduit 70 into the intermediate absorber 71. The inflowing gas is contacted with 98.5% sulphuric acid at 70° C. trickling in a counter-current and is thus freed from $SO_3$ (not shown). Then the gas is fed at a temperature of 70° C. through conduit 72 into the intermediate heat exchanger 68, where it is heated to 420° C. and then fed through conduit 73 into the third contacting tray 74. At a temperature of 460°., the gas enters through conduit 75 the stream generator 76, where it is cooled to 400° C. Through conduit 79, the gas is fed to the last contacting tray 80. After an overall conversion of 99.7%, the finish-catalyzed gas at a temperature of 405° C. leaves the contacting vessel 56 through conduit 81 and is cooled to 170° C. in the feed water preheater 82, fed through conduit 83 into the final absorber, where it is freed from $SO_3$ by contacting with 98.5% sulphuric acid at 70° C. trickling in a counter-current (not shown) and then discharged through conduit 85. 5000 kg of saturated steam per hour at a pressure of 22 atm above atmospheric are produced from feed water at 100° C. in the waste boiler 53, steam generator 61 and 76.

Figure 5:
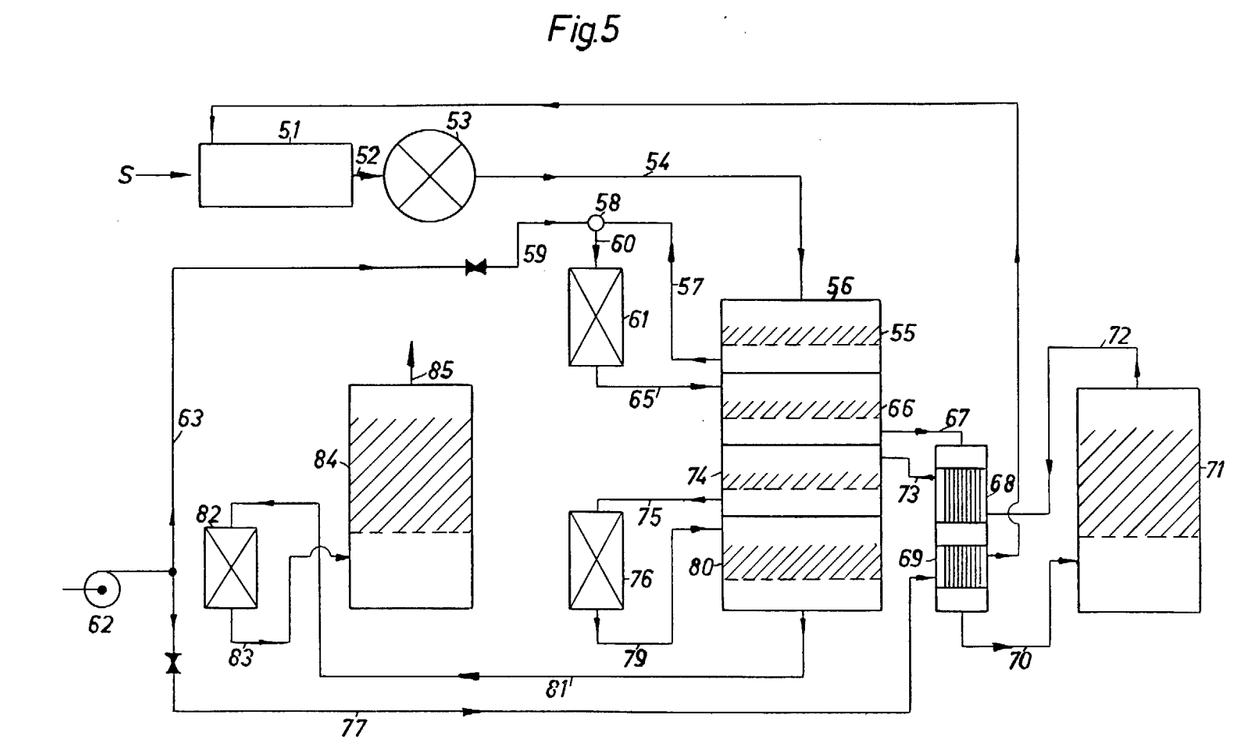

EXAMPLE 5 (FIG. 5)

1360 kg of sulphur per hour together with 9300 standard cubic meters per hour of dried air with a temperature of 105° C. are burnt in the sulphur combustion chamber 51. The gas produced is at a rate of 9300 standard cubic meters at a temperature of 1040° C. and has a $SO_2$-content of 10% by volume. The gas is passed through conduit 52 into the waste heat boiler 53, where the gas is cooled to a temperature of 420° C. The cooled gas is fed through conduit 54 into the first contacting tray 55 of the contacting vessel 56. The tray 55 contains 18% of the whole catalyst. The gas leaves the contacting tray 55 in conduit 57 at a temperature of 600° C. and is cooled in the mixing chamber 58 with 900 standard cubic meters per hour of cold dried air, which is at 50° C. and supplied through conduit 59. The gas flows through conduit 60 into the steam generator 61, where the precatalyzed gas is cooled to 460° C. From the steam generator 61, the gas is fed through conduit 65 into the second contacting tray 66. The tray 66 contains 22% of the whole catalyst. After a conversion of 86% the further catalyzed gas at a temperature of 515° C. is fed through conduit 67 into the intermediate heat exchanger 68, where it is cooled to 220° C. by heat exchange with the outflowing gas from the intermediate absorber 71 which is fed into the intermediate heat exchanger 68 at a temperature of 70° C. through the conduit 72. The cooled gas is fed into the heat exchanger 69, where it is further cooled to 170° C. by heat exchange with 9300 standard cubic meters of dried cold air at 50° C. introduced via conduit 77 and is fed through conduit 70 into the intermediate absorber 71. The air is heated to 105° C. and fed into sulphur combustion chamber 1. The inflowing gas is contacted with 98.5% sulphuric acid at 70° C. trickling in a counter-current and is thus freed from $SO_3$ (not shown). Then the gas is fed at a temperature of 70° C. through conduit 72 into the intermediate heat exchanger 68, where it is heated to 420° C. and then fed through conduit 73 into the third contacting tray 74. At a temperature of 460° C., the gas enters through conduit 75 the steam generator 75, where it is cooled to 400° C. Through conduit 79, the gas is fed to the last contacting tray 80. After an overall conversion of 99.7% the finish-catalyzed gas at a temperature of 405° C. leaves the contacting vessel 56 through conduit 81 and is cooled to 170° C. in the feed water preheater 82, fed through conduit 83 into the final absorber 84, where it is freed from $SO_3$ by contacting with 98.5% sulphuric acid at 70° C. trickling in a countercurrent (not shown) and then discharged through conduit 85. 5000 kg of saturated steam per hour at a pressure of 22 atm above atmospheric are produced from feed water at 100° C. in the waste boiler 53, steam generator 61 and 76. By the decrease of temperature of the gas in mixer 10, the heat exchanger 5 need not be made of high temperature resistant steel.

The concentration of the $H_2SO_4$ fed into the intermediate and final absorbers is about 98–98.5%. Due to the high quantity of $H_2SO_4$ trickling through the absorbers the increase of concentration of $H_2SO_4$ is only 0.1–0.2%.

If the starting gas has an $SO_2$-content of 6.7% the gas discharged from the final absorber has a $SO_2$ content of 0.7% per standard cubic meters.

If the starting gas has an $SO_2$-content of 10% the gas discharged from the final absorber has an $SO_2$-content of 1.4 g per standard cubic meters.

While the invention has been described in respect to particular embodiments thereof, these embodiments are merely representative and do not serve to define the limits of the invention.

What is claimed is:

1. In a process for the production of $SO_3$ by catalytic conversion of $SO_2$ which comprises:
    passing a $SO_2$-containing feed gas through a first catalyst contacting stage for conversion of a part of the $SO_2$ to $SO_3$, the gas being heated by the conversion,
    cooling the gas from the first catalyst stage and passing the cooled gas through an absorber for removal of $SO_3$ therefrom,
    passing the gas from the absorber through a second catalyst contacting stage for conversion of $SO_2$ to $SO_3$, the gas being heated by the conversion, and recovering $SO_3$ produced in the second contacting stage,
    the improvement which comprises the first stage including only two catalyst beds providing a first and second bed in the first stage, the gas being cooled between the beds of the first stage, the conversion in the first stage based on $SO_2$ content of the starting gas being about 70–90%, said cooling of the gas from the first stage being carried out by first passing the first stage effluent gas in indirect heat exchange relation with the absorber effluent gas, and then passing the first stage effluent gas in indirect heat exchange relation with another heat exchange medium for further cooling of the gas, the second stage comprising only two catalyst beds, the gas from the absorber being passed through the first bed and thereafter the second bed, the gas being cooled after passage through the first bed and before introduction into the second bed, with substantial reduction in catalyst required for the process.

2. Process according to claim 1, wherein said $SO_2$-containing gas contains less than about 9% $SO_2$, and prior to passing of the $SO_2$-containing gas through said first stage, the $SO_2$-containing gas in the clean dry condition is preheated to catalyst initiation temperature by heating the gas by indirect heat exchange with heated $SO_3$-containing gas from the conversion of $SO_2$ to $SO_3$.

3. Process according to claim 1, wherein:
    a major part of said feed gas is passed in indirect heat exchange relation with the hot gas from the second bed of the second contacting stage,
    a minor part of said feed gas is passed in indirect heat exchange relation with hot gas from the first bed of said second contacting stage cooling the gas from the bed for delivery to the second bed of the second contacting stage,
    said major part and minor part are further heated by being passed in indirect heat exchange relation with hot gas from the first bed of the first contacting stage cooling the gas from the first bed of the first contacting stage for delivery to the second bed of the first contacting stage, and heating said major and minor parts to the initiation temperature of the first bed of the first contacting stage, and
    contacting the major and minor part with the catalyst in the first bed.

4. Process according to claim 3, wherein said another heat exchange medium is a part of said feed gas.

5. Process according to claim 4, wherein the feed gas heated by indirect heat exchange relation with the first stage effluent gas is included with the feed gas introduced into the first stage.

6. Process according to claim 4, wherein the feed gas heated by indirect heat exchange relation with the first stage effluent gas is combined with the hot gas from the first bed of the first stage and passed in indirect heat exchange relation with said major and minor part of the feed gas.

7. Process according to claim 3, the hot gas from the first bed of the first contacting stage being cooled to about 550°–565° C. prior to introduction thereof into heat exchange relation with said major and minor part of the feed gas, said cooling to about 550°–565° C. being by admixing about 8–14% of the feed gas with the hot gas.

8. Process according to claim 3, wherein the temperature of the major and minor part upon entering the heat exchange relation with the hot gas from the first bed of the first contacting stage is about 320°–340° C.

9. Process according to claim 1, said cooling of the gas from the first bed of the first contacting stage being by indirect heat exchange in a heat exchanger, the gas being cooled prior to introduction into the heat exchanger by admixing therewith about 8–14% of the feed gas, the cooling being to about 550°–565° C.

10. Process according to claim 1, wherein said another heat exchange medium is a part of said feed gas.

11. Process according to claim 10, wherein the feed gas heated by indirect heat exchange relation with the first stage effluent gas is included with the feed gas introduced into the first stage.

12. Process according to claim 1, the catalyst mass in the first stage being about 40 liters per day ton of $SO_3$ monohydrate.

13. Process according to claim 1, wherein, in said cooling of the first stage gas, the first stage gas is cooled to the absorber inlet temperature in said heat exchange with said another heat exchange medium.

14. In a process for the production of $SO_3$ by catalytic conversion of $SO_2$ which comprises:
passing sulfur combustion gas containing about 8–11% $SO_2$ through a first catalytic contacting stage for conversion of part of the $SO_2$ to $SO_3$, the gas being heated by the conversion,
cooling the effluent gas from the first stage, and
subjecting the cooled first stage effluent gas to an absorption treatment to remove $SO_3$ therefrom,
passing the gas from the absorption through a second catalytic contacting stage for conversion of $SO_2$ to $SO_3$, the gas being heated by the conversion, and
recovering $SO_3$ produced in the second contacting stage,
the improvement which comprises the first stage including only two catalyst beds providing a first and a second bed in the first stage, the gas being cooled between the beds of the first stage, the conversion in said first stage being about 70–90% based on the $SO_2$ content of the starting gas, said cooling of the gas from the first stage being carried out by first passing the first stage effluent gas in indirect heat exchange relation with the absorber effluent gas, and then passing the first stage effluent gas in indirect heat exchange relation with another heat exchange medium for further cooling of the gas, the second stage comprising only two catalyst beds, the gas from the absorber being passed through the first bed and thereafter through the second bed, the gas being cooled after passage through the first bed and before introduction into the second bed, with substantial reduction in catalyst required for the process.

15. Process according to claim 14, the gas passed to the second bed of the second contacting stage being cooled by indirect heat exchange with dry cold air.

16. Process according to claim 15, the gas passed to the second bed of the first contacting stage being cooled by indirect heat exchange with dry cold air.

17. Process according to claim 15, wherein the cold air is heated in said heat exchange and the heated air is used for burning sulfur and the resulting gas is used as said combustion gas.

18. Process according to claim 16, wherein the cold air is heated in said heat exchanges and the heated air is used for burning sulfur and the resulting gas is used as said combustion gas.

19. Process according to claim 18, wherein the effluent gas from the first stage is cooled to the absorber inlet temperature by said cooling thereof, and wherein the effluent gas from the second stage is cooled by indirect heat exchange in a steam generator and the resulting cooled gas is passed through an absorber for removal of $SO_3$ therefrom, and wherein said cooling of the gas from the first bed of the first contacting stage by indirect heat exchange with cold air is in a heat exchanger, the gas being cooled prior to introduction into the heat exchanger by admixing cold air therewith to cool the feed to the heat exchanger to about 550°–565° C.

20. Process according to claim 14, said absorption being effected with about 98–98.5% sulfuric acid.

21. Process according to claim 14, the gas passed to the second bed of the first contacting stage being cooled by indirect heat exchange with dry cold air.

22. Process according to claim 14, wherein the effluent gas from the second stage is cooled by indirect heat exchange in a stream generator and the resulting cooled gas is passed through an absorber for removal of $SO_3$ therefrom.

23. Process according to claim 14, wherein sulfur is burned and the resulting gas is used as said combustion gas, combustion gas is cooled in a steam generator to the catalyst initiation temperature of the first catalytic contacting stage, and is thereafter introduced into the first stage.

24. Process according to claim 14, said cooling of the gas from the first bed of the first contacting stage being by indirect heat exchange in a heat exchanger, the gas being cooled prior to introduction into the heat exchanger by admixing cold air therewith to cool the feed to the heat exchanger to about 550°–565° C.

25. Process according to claim 14, the catalyst mass in the first stage being about 40 liters per day ton of $SO_3$ monohydrate.

26. In a process for production of $SO_3$ which comprises:
producing a gas mixture containing $SO_2$ and oxygen,
contacting said gas mixture with catalyst for conversion of $SO_2$ to $SO_3$ in a first catalyst contacting stage for conversion of part of the $SO_2$ and $SO_3$, the gas mixture being heated by the conversion,
cooling the effluent of said first stage contacting and passing the cooled gas mixture through an absorber for removal of $SO_3$ therefrom, following said absorption contacting only said cooled gas mixture with catalyst for the conversion of $SO_2$ to $SO_3$ in a second catalyst contacting stage for further conversion of $SO_2$ to $SO_3$, the gas mixture being heated by said further conversion, and
recovering $SO_3$ produced in the second contacting stage,
the improvement which comprises the first stage including only two catalyst beds providing a first and second bed in the first stage, the gas being cooled between the beds of the first stage, the conversion in the first stage based on $SO_2$ content of the starting gas being about 70–90%, said cooling of the gas from the first stage being carried out by first passing the first stage effluent gas in indirect heat exchange relation with the absorber effluent gas, and then passing the first stage effluent gas in indirect heat exchange relation with another heat exchange medium for further cooling of the gas, the second stage comprising only two catalyst beds, the gas from the absorber being passed through the first bed and thereafter the second bed, the gas being cooled after passage through the first bed and before introduction into the second bed, with substantial reduction in catalyst required for the process.

27. Process according to claim 14, wherein said another heat exchange in which the gas from the first stage is cooled is carried out in a steam generator.

28. Process according to claim 14, wherein said another heat exchange in which the gas from the first stage is cooled, is carried out in a steam generator in which the gas from the first stage is cooled to the absorber inlet temperature.

* * * * *

UNITED STATES PATENT OFFICE
CERTIFICATE OF CORRECTION

Patent No. 4,008,316      Dated February 15, 1977

Inventor(s) Herbert Drechsel et al.

Figure 3:
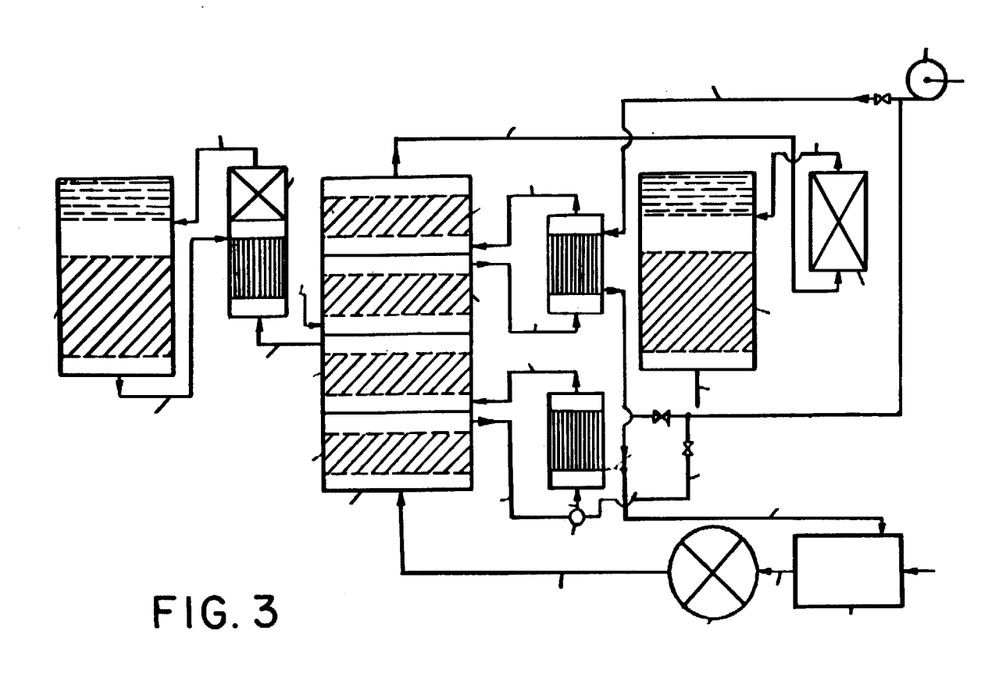
FIG. 3, FIG. 4 and FIG. 5 are flow sheets for the process using a gas rich in $SO_2$.

It is certified that error appears in the above-identified patent and that said Letters Patent are hereby corrected as shown below:

Figures 1 and 3 should appear as shown on the attached sheets.

Signed and Sealed this

Eighth Day of November 1977

[SEAL]

Attest:

RUTH C. MASON
Attesting Officer

LUTRELLE F. PARKER
Acting Commissioner of Patents and Trademarks

Fig.1

Fig.3